(12) United States Patent
Eronen et al.

(10) Patent No.: US 9,959,850 B2
(45) Date of Patent: May 1, 2018

(54) ACOUSTIC MUSIC SIMILARITY DETERMINER

(71) Applicant: Nokia Technologies Oy, Espoo (FI)

(72) Inventors: Antti Eronen, Tampere (FI); Jussi Leppänen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days. days.

(21) Appl. No.: 14/899,004

(22) PCT Filed: Jun. 9, 2014

(86) PCT No.: PCT/FI2014/050463
§ 371 (c)(1),
(2) Date: Dec. 16, 2015

(87) PCT Pub. No.: WO2014/207297
PCT Pub. Date: Dec. 31, 2014

(65) Prior Publication Data
US 2016/0125859 A1    May 5, 2016

(30) Foreign Application Priority Data
Jun. 24, 2013 (GB) .................................. 1311153.9

(51) Int. Cl.
*G06F 17/00* (2006.01)
*G10H 1/00* (2006.01)
(Continued)

(52) U.S. Cl.
CPC ........... *G10H 1/0008* (2013.01); *G10L 25/51* (2013.01); *G06F 17/30743* (2013.01);
(Continued)

(58) Field of Classification Search
CPC ........ G06F 17/30743; G06F 17/30778; G10H 2210/041; G10H 2240/141; G10L 17/02; G10L 19/038; G10L 25/51
See application file for complete search history.

(56) References Cited

U.S. PATENT DOCUMENTS 6,246,982 B1 * 6/2001 Beigi ..................... G10L 15/10
704/238
2008/0022844 A1 1/2008 Poliner et al.
(Continued)

FOREIGN PATENT DOCUMENTS

EP 2273384 1/2011

OTHER PUBLICATIONS

Search Report received for corresponding GB Patent Application No. 1311153.9 dated Dec. 18, 2013 5 pages.
(Continued)

*Primary Examiner* — Thomas Maung
(74) *Attorney, Agent, or Firm* — Alston & Bird LLP

(57) ABSTRACT

It is inter alia disclosed a method comprising: determining a divergence measure between a statistical distribution of audio features of a first audio track and a statistical distribution of audio features of at least one further audio track; determining a divergence measure threshold value from at least the divergence measure between the statistical distribution of audio features of a first audio track and the statistical distribution of audio features of the at least one further audio track; and comparing the divergence measure with the divergence measure threshold value.

20 Claims, 6 Drawing Sheets

(51) Int. Cl.
*G10L 25/51* (2013.01)
*G06F 17/30* (2006.01)

(52) U.S. Cl.
CPC . *G10H 2210/041* (2013.01); *G10H 2210/091* (2013.01); *G10H 2240/141* (2013.01)

(56) References Cited

U.S. PATENT DOCUMENTS

2009/0281906 A1   11/2009  Cai et al.
2011/0004642 A1*   1/2011  Schnitzer .......... G06F 17/30743
                                                    700/94

OTHER PUBLICATIONS

International Search Report and Written Opinion received for corresponding Patent Cooperation Treaty Application No. PCT/FI2014/050463, dated Jun. 2, 2011, 11 pages.
Flexer, A. et al. "Effects of album and artist filters in audio similarity computed for very large musci databases", Computer Music Journal vol. 34, issue 3, Sep. 2010, pp. 20-28.
Pei, S.C. et al. "A novel music similarity measure system based on instrumentation analysis", IEEE Int. Conf. on Multipmedia and Expo, Sep. 28-Jul. 3, 2009, New York, USA, pp. 470-473.
McFee B. et al. "Learning content similarity for music recommendation", IEEE Trans. on Audio, Speech, and Language Processing, vol. 20, No. 8, Oct. 2012, pp. 2207-2218.
Pampalk, "Computational Models of Music Similarity and their Application to Music Information Retrieval", Dissertation, Mar. 2006, 165 pages.
Vasilache, "Speech Recognition Using HMMs with Quantized Parameters", In. Proceedings of the International Conference on. Spoken Language Processing, vol. 1, 2000, pp. 441-443.
Bocchieri, "Vector quantization for efficient computation of continuous density likelihoods", IEEE International Conference on Acoustics, Speech, and Signal Processing, vol. 2, 1993, pp. 692-695.
"Locality-sensitive hashing", Wikipedia, Retrieved on Nov. 4, 2016, Webpage available at : https://en.wikipedia.org/wiki/Locality-sensitive_hashing.
"Cluster analysis", Wikipedia, Retrieved on Nov. 4, 2016, Webpage available at : http://en.wikipedia.org/wiki/Cluster_analysis.
Extended European Search Report received for corresponding European Patent Application No. 14817324.8, dated Oct. 25, 2016, 4 pages.
Levy et al. "Lightweight measures for timbral similarity of musical audio" Proceedings of the 1st ACM workshop on Audio and Music Computing Multimedia, Oct. 27, 2006, pp. 27-35.

\* cited by examiner

ACOUSTIC MUSIC SIMILARITY DETERMINER

RELATED APPLICATION

This application was originally filed as PCT Application No. PCT/FI2014/050463 filed Jun. 9, 2014 which claims priority benefit from GB application No. 1311153.9, filed Jun. 24, 2013.

FIELD

The present application relates to audio analysis of audio signals, and in particular, but not exclusively to the computation of acoustic music similarities.

BACKGROUND

Music can include many different audio characteristics such as beats, downbeats, chords, melodies and timbre. There can be a number of practical applications for which it is desirable to identify at least some of the above audio characteristics from a musical signal. Such applications can include music recommendation and electronic music distribution (EMD) applications in which music similar to a reference track is searched from a music catalogue or music database. These applications typically use music similarity measures to characterize the music track, which facilitates the searching of large music catalogues for potentially similar music.

In particular the character of music may be expressed in terms of the timbre of the music signal. Features describing the timbre or other characteristics of the music signal may be used to form a pairwise comparison between each music track within the music catalogue and the reference music track. However for large music catalogues this process can be computationally demanding for the host computational device which can result in unacceptable delay when processing a request for a set of musically similar audio tracks or songs.

The use of efficient content management techniques can enable large music catalogues of the order of tens of millions of tracks to be searched efficiently and effectively for musically similar audio tracks or songs.

SUMMARY

There is provided according to a first aspect a method comprising: determining a divergence measure between a statistical distribution of audio features of a first audio track and a statistical distribution of audio features of at least one further audio track; determining a divergence measure threshold value from at least the divergence measure between the statistical distribution of audio features of a first audio track and the statistical distribution of audio features of the at least one further audio track; and comparing the divergence measure with the divergence measure threshold value.

The method as described herein may further comprise: retaining the at least one further audio track dependent on the comparison of the divergence measure with the divergence measure threshold value; and determining the audio similarity of the retained at least one further audio track to the first audio track.

The divergence measure may comprise parameters associated with the statistical distribution of audio features of the first audio track and parameters associated with the statistical distribution of audio features of the at least one further audio track.

The determining the divergence measure between the statistical distribution of audio features of a first audio track and the statistical distribution of audio features of the at least one further audio track may comprise: quantising the parameters associated with the statistical distribution of audio features of the first audio track; quantising the parameters associated with the parameters associated with the statistical distribution of audio features of the at least one further audio track; and reading the divergence measure from a look up table by using the quantised parameters associated with the statistical distribution of audio features of the first audio track and the quantised parameters associated with the statistical distribution of audio features of the at least one further audio track as inputs to the look up table.

The look up table may comprise a particular divergence measure for at least a pre-determined pairing of quantised parameters associated with the statistical distribution of audio features of the first audio track with quantised parameters associated with the statistical distribution of audio features of at least an audio track from a plurality of audio tracks.

Determining a divergence measure threshold value may comprise: determining a statistical distribution of divergence measures from a plurality of divergence measures between the statistical distribution of audio features of the first audio track and the statistical distribution of audio features of the at least one further audio track; and determining a value of divergence measure which results in a pre-determined proportion of the statistical distribution of divergence measures.

The at least one further audio track may be an audio track from a store comprising a plurality of audio tracks.

The audio features may be a vector of mel-frequency cepstral coefficients for an audio analysis frame.

The parameters associated with the statistical distribution of audio features may comprise at least one of: mean vector of the mel-frequency cepstral coefficients for an audio analysis frame; and standard deviation vector of the mel-frequency cepstral coefficients for an audio analysis frame.

The divergence measure may be based at least in part on an approximation of a symmetrized Kullback-Leibler divergence measure.

The audio similarity of the pre-screened at least one audio track to the first audio track may at least in part be based on a symmetrized Kullback-Leibler divergence measure.

The first audio track may be a seed audio track, and the store comprising the plurality of audio tracks may be a catalogue of audio tracks of an electronic music distribution system.

According to a second aspect of there is provided an apparatus configured to: determine a divergence measure between a statistical distribution of audio features of a first audio track and a statistical distribution of audio features of at least one further audio track; determine a divergence measure threshold value from at least the divergence measure between the statistical distribution of audio features of a first audio track and the statistical distribution of audio features of the at least one further audio track; and compare the divergence measure with the divergence measure threshold value.

The apparatus as described herein may be further configured to: retain the at least one further audio track dependent on the comparison of the divergence measure with the divergence measure threshold value; and determine the audio similarity of the retained at least one further audio track to the first audio track.

The divergence measure may comprise parameters associated with the statistical distribution of audio features of the first audio track and parameters associated with the statistical distribution of audio features of the at least one further audio track.

The apparatus configured to determine the divergence measure between the statistical distribution of audio features of a first audio track and the statistical distribution of audio features of the at least one further audio track may be further configured to: quantise the parameters associated with the statistical distribution of audio features of the first audio track; quantise the parameters associated with the parameters associated with the statistical distribution of audio features of the at least one further audio track; and read the divergence measure from a look up table by using the quantised parameters associated with the statistical distribution of audio features of the first audio track and the quantised parameters associated with the statistical distribution of audio features of the at least one further audio track as inputs to the look up table.

The look up table may comprise a particular divergence measure for at least a pre-determined pairing of quantised parameters associated with the statistical distribution of audio features of the first audio track with quantised parameters associated with the statistical distribution of audio features of at least an audio track from a plurality of audio tracks.

The apparatus configured to determine a divergence measure threshold value may be further configured to: determine a statistical distribution of divergence measures from a plurality of divergence measures between the statistical distribution of audio features of the first audio track and the statistical distribution of audio features of the at least one further audio track; and determine a value of divergence measure which results in a pre-determined proportion of the statistical distribution of divergence measures.

The at least one further audio track is may be an audio track from a store comprising a plurality of audio tracks.

The audio features may be a vector of mel-frequency cepstral coefficients for an audio analysis frame.

The parameters associated with the statistical distribution of audio features may comprise at least one of: mean vector of the mel-frequency cepstral coefficients for an audio analysis frame; and standard deviation vector of the mel-frequency cepstral coefficients for an audio analysis frame.

The divergence measure may be based on an approximation of a symmetrized Kullback-Leibler divergence measure.

The audio similarity of the pre-screened at least one audio track to the first audio track may be based on a symmetrized Kullback-Leibler divergence measure.

The first audio track may be a seed audio track, and the store comprising the plurality of audio tracks may be a catalogue of audio tracks of an electronic music distribution system.

There is according to a third aspect an apparatus comprising at least one processor and at least one memory including computer program code for one or more programs, the at least one memory and the computer program code configured to, with the at least one processor, cause the apparatus to perform at least: determine a divergence measure between a statistical distribution of audio features of a first audio track and a statistical distribution of audio features of at least one further audio track; determine a divergence measure threshold value from at least the divergence measure between the statistical distribution of audio features of a first audio track and the statistical distribution of audio features of the at least one further audio track; and compare the divergence measure with the divergence measure threshold value.

The apparatus as described herein may be further caused to: retain the at least one further audio track dependent on the comparison of the divergence measure with the divergence measure threshold value; and determine the audio similarity of the retained at least one further audio track to the first audio track.

The divergence measure comprises parameters associated with the statistical distribution of audio features of the first audio track and parameters associated with the statistical distribution of audio features of the at least one further audio track.

The apparatus caused to determine the divergence measure between the statistical distribution of audio features of a first audio track and the statistical distribution of audio features of the at least one further audio track may be further caused to quantise the parameters associated with the statistical distribution of audio features of the first audio track; quantise the parameters associated with the parameters associated with the statistical distribution of audio features of the at least one further audio track; and read the divergence measure from a look up table by using the quantised parameters associated with the statistical distribution of audio features of the first audio track and the quantised parameters associated with the statistical distribution of audio features of the at least one further audio track as inputs to the look up table.

The look up table may comprise a particular divergence measure for at least a pre-determined pairing of quantised parameters associated with the statistical distribution of audio features of the first audio track with quantised parameters associated with the statistical distribution of audio features of at least an audio track from a plurality of audio tracks.

The apparatus configured to determine a divergence measure threshold value may be further configured to: determine a statistical distribution of divergence measures from a plurality of divergence measures between the statistical distribution of audio features of the first audio track and the statistical distribution of audio features of the at least one further audio track; and determine a value of divergence measure which results in a pre-determined proportion of the statistical distribution of divergence measures.

The at least one further audio track may be an audio track from a store comprising a plurality of audio tracks.

The audio features may be a vector of mel-frequency cepstral coefficients for an audio analysis frame.

The parameters associated with the statistical distribution of audio features may comprise at least one of: mean vector of the mel-frequency cepstral coefficients for an audio analysis frame; and standard deviation vector of the mel-frequency cepstral coefficients for an audio analysis frame.

The divergence measure may be based on an approximation of a symmetrized Kullback-Leibler divergence measure.

The audio similarity of the pre-screened at least one audio track to the first audio track may be based on a symmetrized Kullback-Leibler divergence measure.

The first audio track may be a seed audio track, and the store comprising the plurality of audio tracks may be a catalogue of audio tracks of an electronic music distribution system. A computer program code may be configured to realize the actions of the method herein when executed by a processor.

An electronic device may comprise apparatus as described herein.

A chipset may comprise apparatus as described herein.

BRIEF DESCRIPTION OF DRAWINGS

For better understanding of the present invention, reference will now be made by way of example to the accompanying drawings in which.

DESCRIPTION OF SOME EMBODIMENTS

Figure 1:
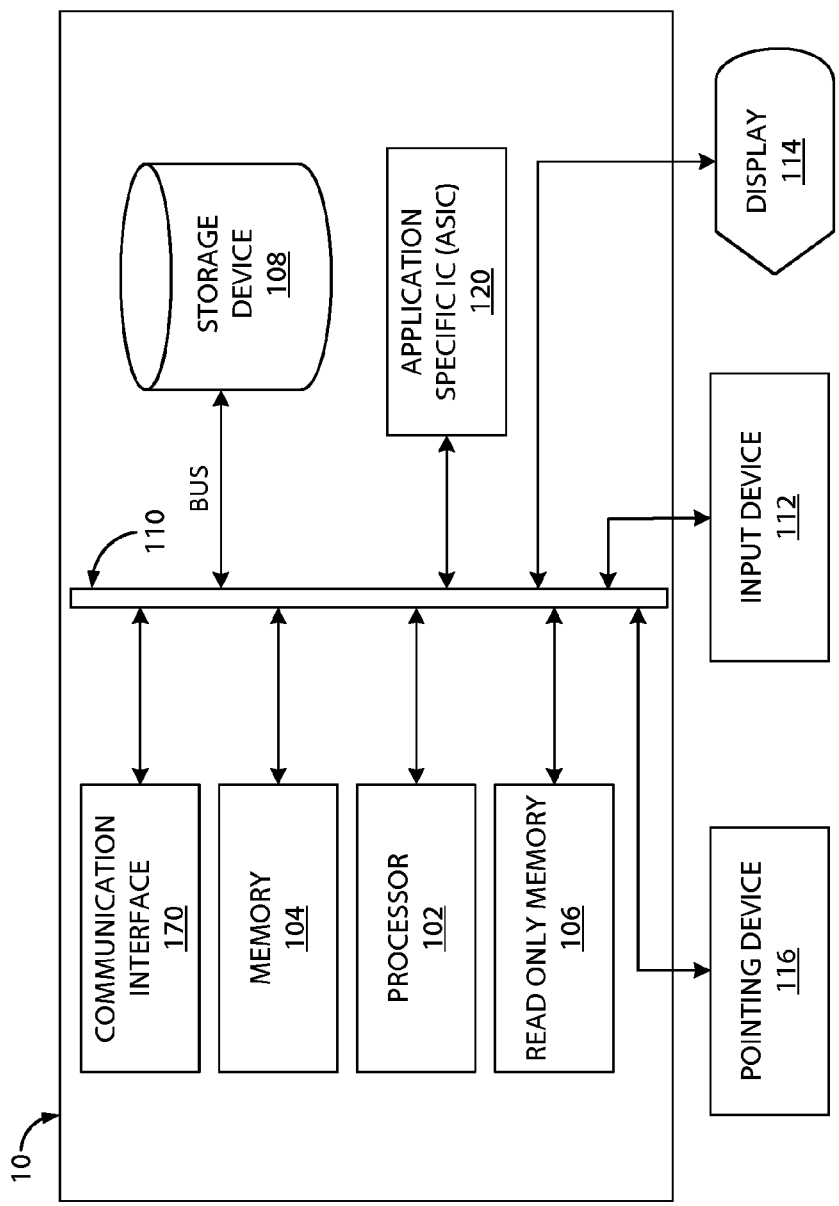
FIG. 1 shows schematically an electronic device employing some embodiments.

The following describes in more detail possible acoustic music similarity analysers. In this regard reference is first made to FIG. 1 which shows a schematic block diagram of an exemplary computing device or apparatus 10, which may incorporate a music similarity analyser according to an embodiment of the application.

The apparatus 10 may for example be a computer system or computer server adapted to communicate over a fixed or wireless network. In other embodiments the apparatus may be for example a mobile terminal, user equipment of a wireless communication system or any other computer system suitable for processing audio signals.

The computing device or apparatus 10 may be programmed (e.g., via computer program code or instructions) to process and analyse audio signals for similarities described herein and includes a communication mechanism such as a bus 110 for passing information between various internal and external components of the computer device 10.

The computing device 10, or a portion thereof, may constitute means for performing one or more steps analysing audio signals for the purpose of determining acoustic audio similarities.

The processor (or multiple processors) 102 may perform as specified by a computer program code a set of operations on information relating to analysing music signals for the purpose of determining acoustic music similarities.

The computer program code in embodiments is a set of instructions or statements providing instructions for the operation of the processor and/or the computer system to perform specified functions. The computer code, for example, may be written in a computer programming language that is compiled into a native instruction set of the processor. The code may also be written directly using the native instruction set (e.g., machine language).

The set of operations as determined by the computer code may include retrieving information from the bus 110. The set of operations may also include: comparing two or more units of information; shifting positions of units of information, and combining two or more units of information. These operations may be performed on a processor 102 by utilising operators such as by addition or multiplication or logical operator such as OR, exclusive OR (XOR), and AND. The processor 102 may be instructed to perform each operation by using processor instructions. The processor instruction in its simplest form may be derived from a set of basic operation codes which may be sequenced together as a set of processor or computer instructions.

The computing device or apparatus 10 may also include a memory 104 coupled to the bus 110. The memory 104, which can be random access memory (RAM) or any other dynamic storage device, may be arranged to store information including processor instructions for determining acoustic music similarities in audio signals. The memory 104 may also be arranged to hold temporary values used during execution of processor instructions.

The apparatus 10 may also comprise static based memory such as read only rom (ROM) 106 which can be used for the storage of program codes and static variables which do not change during the execution of a program. As above, the static based memory may also be arranged to be coupled to the bus 110 thereby enabling the movement of program instructions and the like to the processor for execution.

The processor 102 can in some embodiments be configured to execute various program codes. The implemented program codes in some embodiments comprise a code for determining acoustic audio (or music) similarities in audio signals as described herein. The implemented program codes can in some embodiments be stored for example in the memory 104 for retrieval by the processor 102 via the bus 110 whenever needed. The memory 104 could further provide a section for storing data, for example data that has been processed in accordance with the application.

FIG. 1 also depicts is a non-volatile (persistent) storage device 108 coupled to the bus 110. The storage device 108 may take the form of a magnetic disk, optical disk or flash card, and may also be used for storing information such as program instructions.

Shown in FIG. 1 is an external input device 112 such as a keyboard by other sensors, which may be used to impart information from a user to the apparatus or computing device 10.

Display devices 114 may also be coupled to the bus 110, which may be of the form of at least a cathode ray tube (CRT), a liquid crystal display (LCD), a light emitting diode (LED) display, an organic LED (OLED) display, a plasma screen, or a printer for presenting text or images. Additionally the apparatus 10 may also have an external pointing device 116 for controlling a position of a small cursor image and issuing commands and associated with graphical elements presented on the display 114. Such devices may be at least one of a mouse, a trackball, cursor direction keys, and a motion sensor. In some embodiments, the apparatus 10 may perform all its functions automatically without the need for human input. In such embodiments one or more of the external input devices may be omitted.

The apparatus 10 may also comprise special purpose hardware, such as an application specific integrated circuit (ASIC) 120, linked to the bus 110. The special purpose hardware 120 may be structured to perform task specific operations in a manner which may be more efficient than performing the same task on the processor 102.

The apparatus 10 may also include one or more instances of a communications interface 170 coupled to bus 110. The communication interface 170 may provide one-way or two-way communication in order to couple a variety of external devices such as printers, scanners and external disks. For example, the communication interface 170 may be a parallel port or a serial port or a universal serial bus (USB) port on a personal computer. In some embodiments, communications interface 170 may be an integrated services digital network (ISDN) card or a digital subscriber line (DSL) card or a telephone modem which may provide a communication connection to a telephone line of some description. In some embodiments, the communication interface 170 may be a cable modem which converts signals from the bus 110 into signals suitable for communication over a coaxial cable or optical fibre. In other examples, the communication interface 170 may be a local area network (LAN) card to provide data communication connection over a LAN, such as Ethernet.

The apparatus 10 may also comprise wireless links whereby the communications interface 170 may send or receive digital electrical, acoustic or electromagnetic signals, including infrared and optical signals. For example, in wireless handheld devices, such as a mobile telephone or the like, the communications interface 170 may include a radio band electromagnetic transmitter and receiver called a radio transceiver. The apparatus 10 may then be configured to receive a bit stream with representing digitised or encoded audio music signals for processing by the processor 102 via the communication interface 170.

In some embodiments the communication interface 170 may enable connection to wireless networks using cellular transmission protocols such as Enhanced Data for Global Evolution (EDGE), General Packet Radio Service (GPRS), Global System for Mobile communication (GSM), Internet protocol multimedia systems (IMS), universal mobile telecommunications systems (UMTS), as well as any other suitable wireless access protocols such as microwave access (WiMAX), Long Term Evolution (LTE) networks, code division multiple access (CDMA), wideband code division multiple access (WCDMA), wireless fidelity (WiFi), satellite, and the like, or any combination thereof. In some embodiments, the communications interface 170 may enable the apparatus 10 to be connected to a mobile terminal or user equipment of a wireless communication system or any other computer based device suitable for processing audio signals such as a video camera, a Television (TV) receiver, audio recorder or audio player such as a mp3 recorder/player, a media recorder (also known as a mp4 recorder/player) and the like.

It is to be understood that the structure of the apparatus 10 could be supplemented and varied in many ways.

The apparatus 10 may comprise an analogue-to-digital converter in order to convert the input analogue audio signal into a digital audio signal and provides the digital audio signal to the processor 102.

The processor 21 in such embodiments then processes the digital audio signal in the same way as described with reference to FIGS. 2 to 6.

Figure 2:
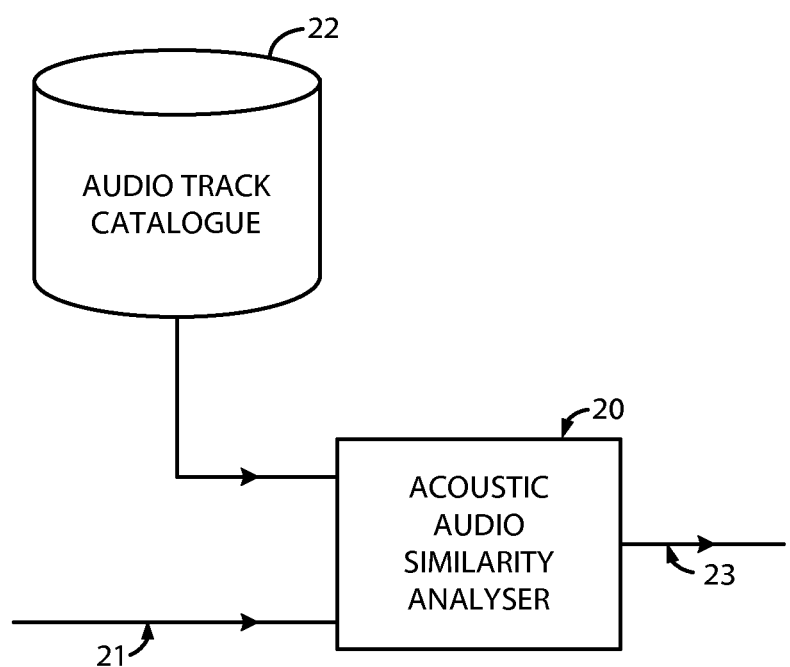
FIG. 2 shows schematically at least part of an electronic music distribution system according to some embodiments.

The general operation of electronic music distribution systems as employed by embodiments is shown in FIG. 2. Illustrated by FIG. 2 is at least part of an electronic music distribution system comprising an audio track catalogue or an audio track database of digitised audio tracks 22 and an acoustic audio similarity analyser 20.

The acoustic audio similarity analyser 20 determines the music features of the digitised seed audio track 21 and the music features of a digitised catalogue audio track from the song catalogue 22. The music similarity analyser 20 can then determine a distance metric between the features of the seed audio track and the features of a catalogue audio track. This process may be repeated by the acoustic audio similarity analyser 20 for a number of the catalogue audio tracks contained within the song catalogue 22. The acoustic audio similarity analyser 20 produces an output 23 comprising information relating to the most similar catalogue audio track or a group of most similar catalogue audio tracks to the musical characteristics of the seed audio track 21.

Figure 3:
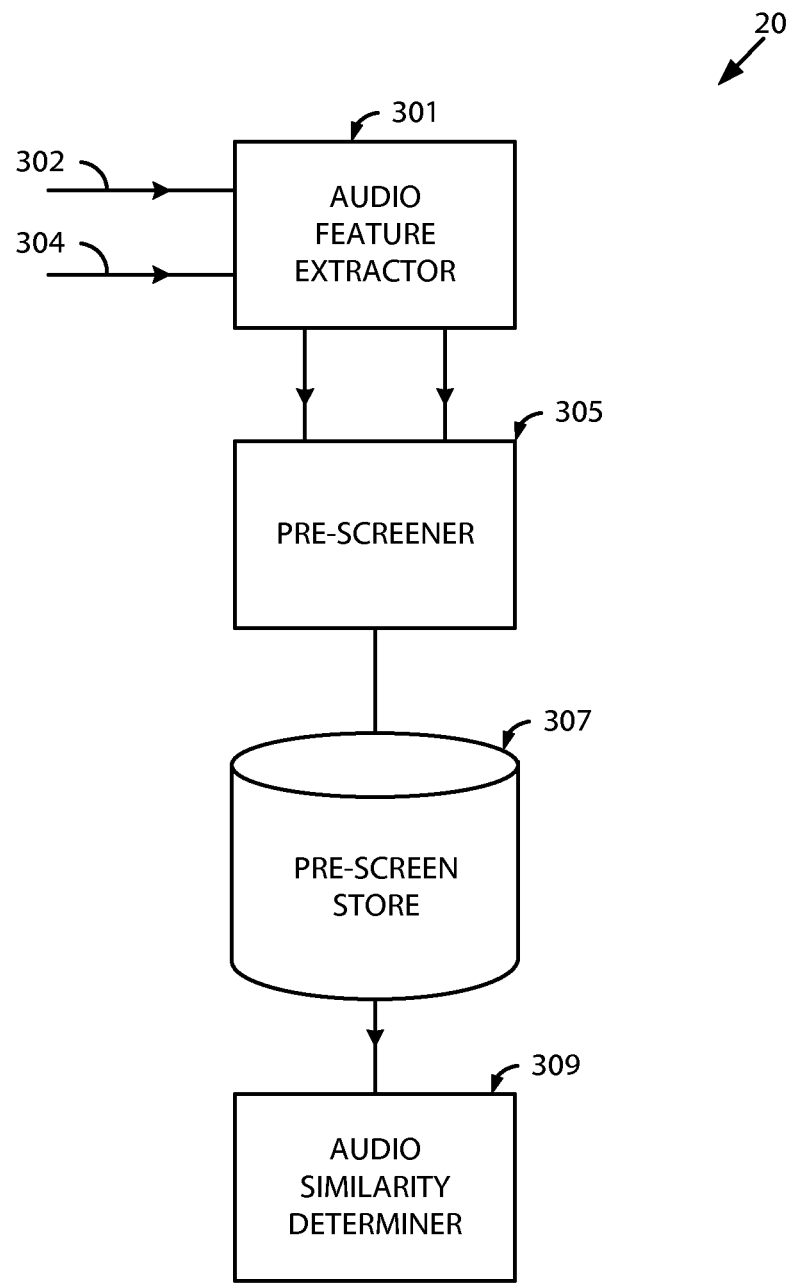
FIG. 3 shows schematically an acoustic audio similarity analyser as shown in FIG. 2 according to some embodiments.
Figure 4:
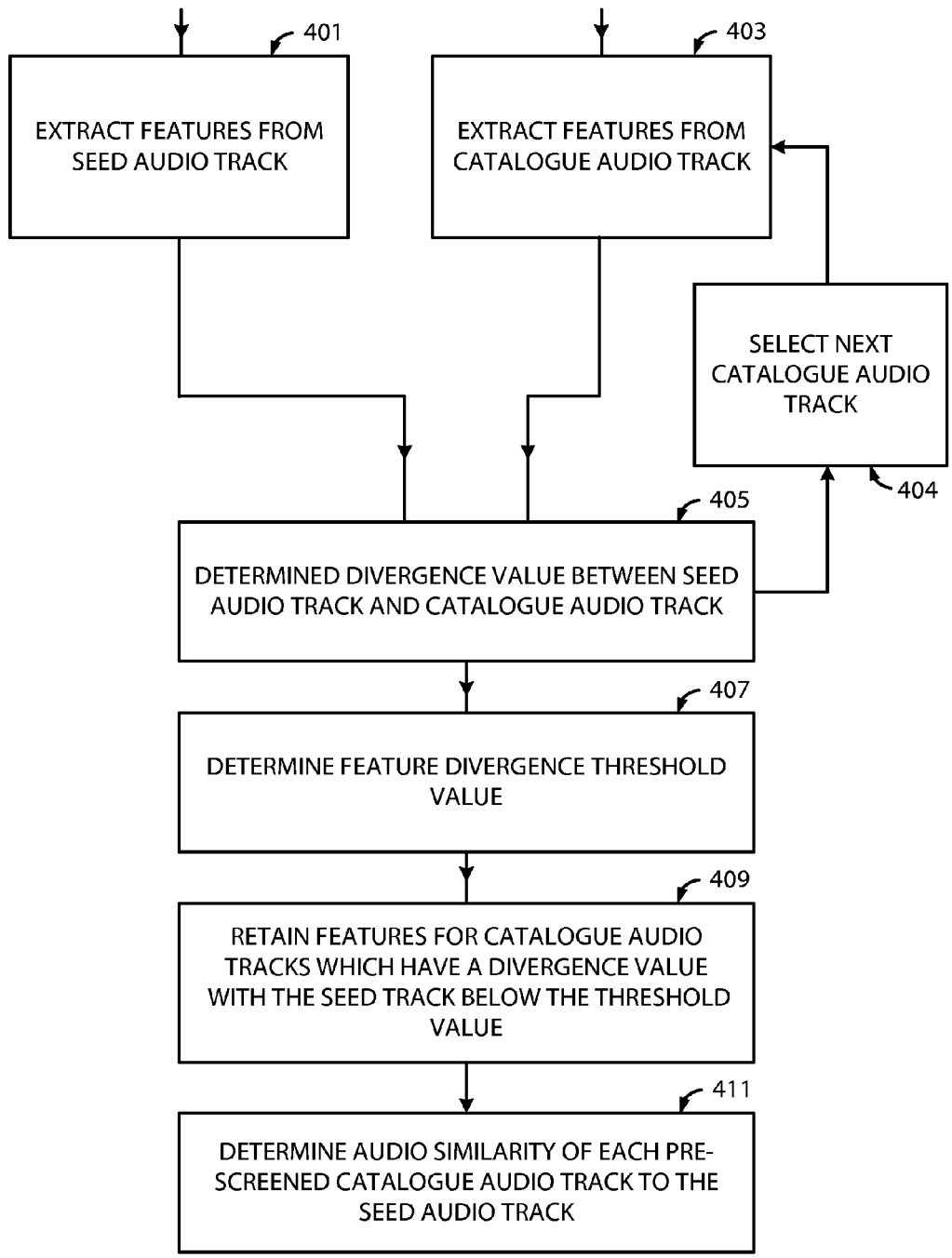
FIG. 4 shows schematically the operation of the acoustic audio similarity analyser of FIG. 3 according to some embodiments.
Figure 5:
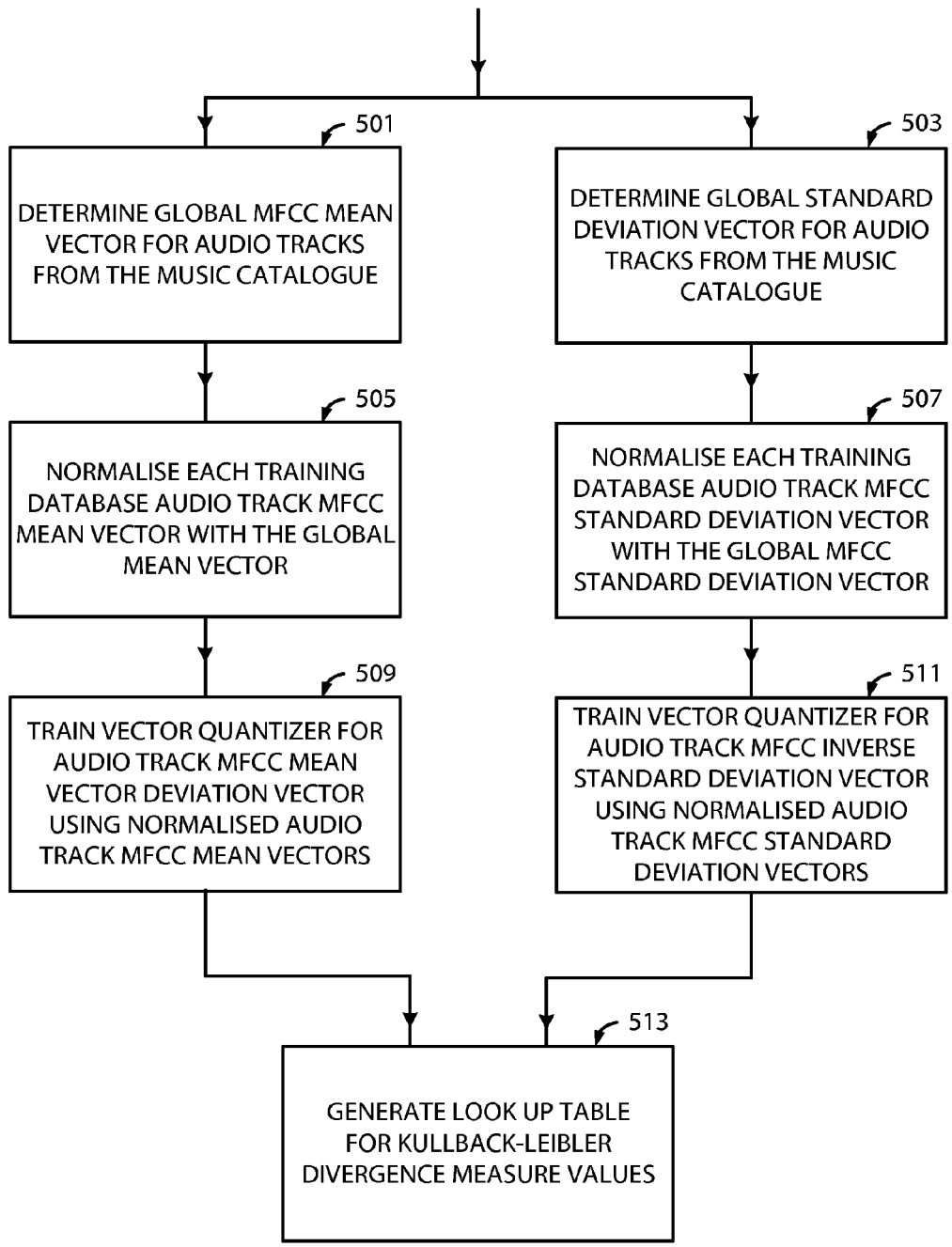
FIG. 5 shows schematically the offline mode of operation of the pre-screener within the acoustic audio similarity analyser of FIG. 3.
Figure 6:
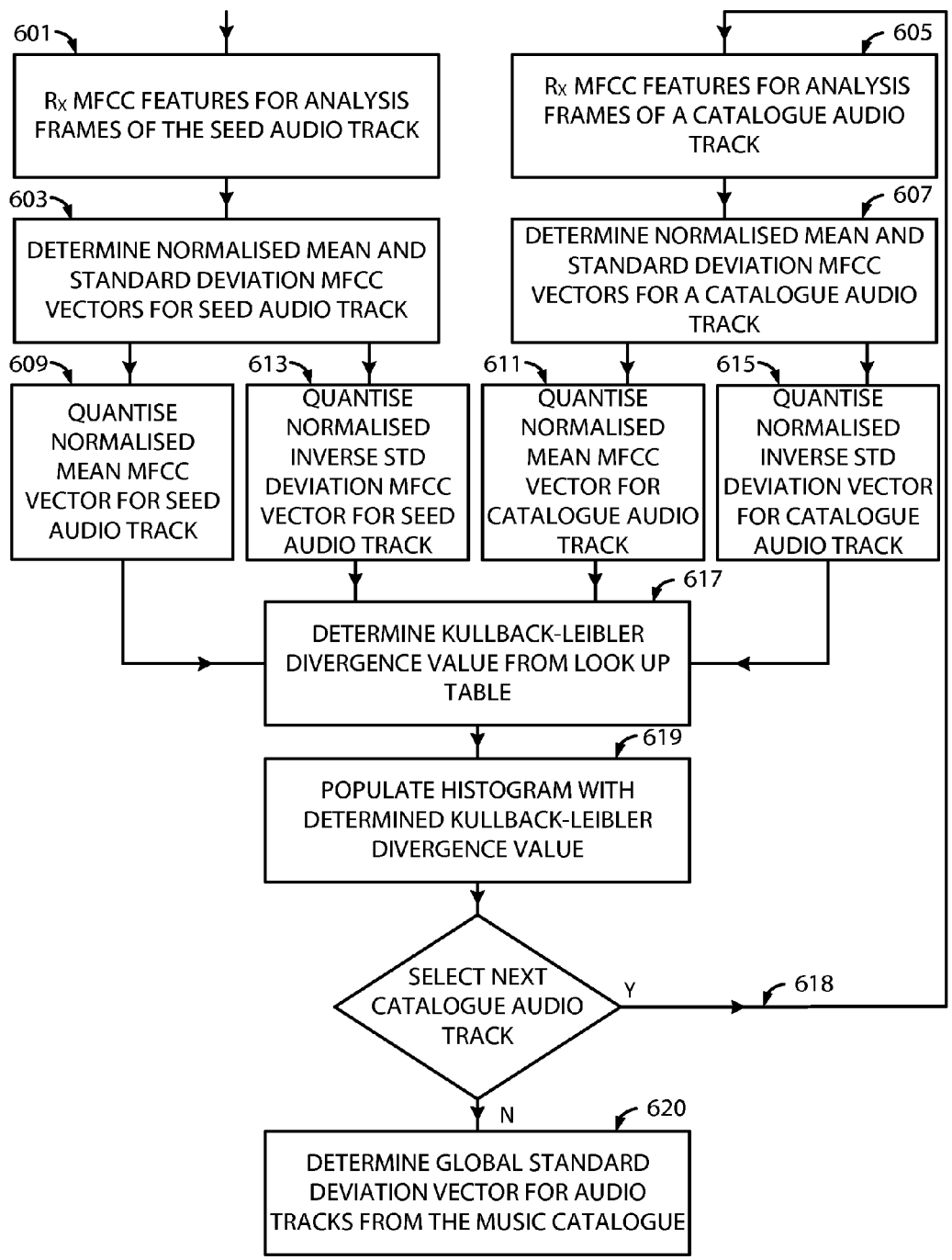
FIG. 6 shows schematically the online mode of operation of the pre-screener within the acoustic audio similarity analyser of FIG. 3.

It would be appreciated that the schematic structures described in FIGS. 1, 2 and 3, and the method steps shown in FIGS. 4, 5 and 6 represent only a part of the operation of an acoustic audio similarity analyser apparatus or method as exemplarily shown implemented in the apparatus shown in FIG. 1.

It is to be understood herein that the audio music song over which members of the database of audio tracks may be compared is termed the seed audio track.

It is to be further understood herein that an audio track from the catalogue or database of audio tracks is termed a catalogue audio track.

It is also to be understood herein that the seed audio track may also be a song from the catalogue. That is, in one example use of the invention, the method is used to compute a set of similar audio tracks for each of the audio tracks in the catalogue and in this case each audio track from the catalogue is the seed audio track while similarities for said seed audio track are calculated.

The concept for the embodiments as described herein is to determine a pre-screening distance metric between a seed audio track and each of a plurality of audio tracks collated in a library, database or catalogue of some description. The pre-screening metric may provide an initial estimate as to the similarity between the seed audio track and each of the audio tracks contained within the catalogue. The initial estimates (or pre-screening metrics) for each combination of seed audio track and audio music song from the catalogue may be used to identify a subset of promising similar audio tracks. The subset of promising similar audio tracks identified from the catalogue may then be further processed using a further song distance measure in order to either identify the most similar audio music song to the seed audio music song or order the subset of promising similar audio tracks in order of similarity to the seed audio track. The pre-screening metric may be determined rapidly and efficiently for a pairing between the seed audio track and an audio track from the catalogue, thereby allowing the content of the audio music catalogue to be quickly scanned for potential audio tracks which may be similar to the seed audio track. To that respect FIG. 3 depicts an example acoustic audio similarity analyser 20 according to some embodiments.

FIG. 4 shows schematically in a flow diagram the operation of the acoustic audio similarity analyser 20. The operation of the acoustic audio similarity analyser 20 will be described from herein in conjunction with FIG. 3.

With reference to FIG. 3 the acoustic audio similarity analyser 20 may be arranged to receive a digitised audio track from the music catalogue 22 along the input link 302. Additionally the acoustic audio similarity analyser 20 may also be arranged to receive a further input along the link 304 whereby the digitised seed audio track may be passed to the acoustic audio similarity analyser 20.

The acoustic audio similarity analyser 20 may be configured to receive both the inputs 302 and 304 at the audio feature extractor 301. The music feature extractor may be arranged to extract features from each of the audio tracks on the inputs 302 and 304. In embodiments the audio feature extractor 301 may be arranged to extract those features from each of the audio tracks which are deemed salient to the identification their musical character.

In a first group of embodiments the audio feature extractor 301 may be configured to extract features from each of the input audio tracks in the form of Mel-Frequency Cepstral Coefficients (MFCC).

In the first group of embodiments the MFCCs may be extracted by first segmenting the input audio track into analysis frames, for which each analysis frame contains a plurality of audio track sample points. For example the input audio track may be divided into analysis frames each of 2048 samples points. A short time frequency spectrum may then be determined for each analysis frame. Typically this may be performed using a Discrete Fourier Transform (DFT) or a derivative thereof such as the Fast Fourier Transform (FFT). The powers of the short time frequency spectrum may then be mapped on to a psychoacoustic frequency scale using an overlapping window function.

In one particular group of embodiments the psychoacoustic scale may be a mel scale and the overlapping window function used to map the spectral powers may be a triangular window function. The log of the spectral powers for each mel frequency may be then be found, and the MFCCs can then be determined by calculating the Discrete Cosine Transform (DCT) over the mel log spectral powers.

It is to be appreciated in embodiments that the low order MFCCs can represent the slowly changing spectral envelope of the audio signal, whilst high order MFCCs can typically represent the fast variations in the spectrum of the audio signal, such as the pitch content.

The MFCCs extracted for each analysis frame may provide a representation of the local timbre of the audio track.

In other embodiments other features may also be extracted from the input audio track. For example, these may include the tempo of the audio track in beats per minute (BPM), downbeats, strengths of different amplitude modulation frequencies, loudness, energy, roughness, spectral irregularity, spectral flatness, chorus, fundamental frequencies or melody, section boundaries (intro, verse, chorus, outro), key, chords, the presence of vocals, singer gender and instrumentation.

The output from the audio feature extractor 301 may be connected to a pre-screener 305.

In embodiments the output may comprise the extracted features of the input seed audio track 304 on an analysis frame by analysis frame basis.

Furthermore, the output from the audio feature extractor 301 can also comprise the extracted features from a catalogue audio track 303 also on an analysis frame by analysis frame basis.

In a first group of embodiments these features can be represented as MFCCs on an analysis by analysis frame basis.

For example, in some embodiments an analysis frame may have a time span of 40 ms with twenty MFCCs per frame.

It is to be appreciated in embodiments that the audio feature extractor 301 may extract the features for each of the plurality of audio tracks from the music catalogue 303 in addition to the features of seed audio track passed 304.

For example, for each seed audio track passed as input to the acoustic music similarity analyser 20 the music feature extractor 301 may extract the MFCCs for each analysis frame of the input seed audio track 304, and the MFCCs relating to each analysis frame for each of the audio music songs searched from the music catalogue 303.

It is to be appreciated in embodiments that the features extracted for the seed audio track 304 may only need to be determined once per search of catalogue. Accordingly, for a search involving a plurality of music songs from the catalogue 303, the pre-screener 305 may store the features extracted from the seed audio track 304 in order to obviate the need to continually recalculate them. Correspondingly, the features extracted from each of the catalogue audio tracks may be stored and therefore are only extracted once for each audio track. The extraction of features can be done in a parallel manner utilizing large computer clusters, where the feature extraction can be run for a plurality of audio tracks simultaneously.

The steps of extracting features from the seed audio track and a catalogue audio track are shown as processing steps 401 and 403 in FIG. 4.

The pre-screener 305 may be arranged to compare a plurality of catalogue audio tracks with the seed audio track 304 for acoustic audio similarities in order to determine a subset of catalogue audio tracks 302. The subset of catalogue audio tracks 302 may then be subjected to further audio similarity analysis.

In embodiments the pre-screener 305 may use a measure of distance between the features of the seed audio track and the features of a catalogue audio track in order to determine an estimate of the audio similarity between the two songs.

In a first group of embodiments the spectral similarity between the seed audio music song and the audio music song from the catalogue 203 may be determined by using the calculated MFCCs from the respective audio tracks. In essence the first group of embodiments may cluster frames of MFCCs from the seed audio track and cluster frames of MFCCs from a catalogue audio track and then compare the distance between the two clusters in order to obtain a measure of similarity.

In the first group of embodiments the clustering of analysis frames of MFCCs may be modelled a single multivariate Gaussian density function. For instance, the cluster of analysis frames of MFCCs for the seed audio track may be denoted by the multivariate Gaussian probability density function (pdf) p, and the cluster of analysis frames of MFCCs for the catalogue audio track may be denoted by the multivariate Gaussian pdf q.

It is to be appreciated in embodiments that the dimension of the multivariate Gaussian pdf is given by the order of the MFCCs in an analysis frame.

In embodiments the pre-screener 305 may determine the distance or divergence between the Gaussian pdf of the seed audio track and the Gaussian pdf of the catalogue audio track by using an approximation to the symmetrized Kullback-Leibler divergence measure.

The symmetrized Kullback-Leibler divergence between the two Gaussian pdfs p and q may be given as $$KLs(p,q)=KL(p|q)+KL(q|p)$$

where $KL(p|q)$ is the Kullback-Leibler divergence between the pdfs p and q. It is to be appreciated that the Gaussian pdfs p and q may represent the Gaussian distribution of MFCCs for the seed audio track p and a catalogue audio track q respectively, or vice versa.

The above Kullback-Leibler divergence measure may be expressed in terms of the mean vector $m_p$, the covariance matrix $\Sigma_p$ and the inverse covariance matrix $\mu_p^{-1}$ for the Gaussian distribution of MFCCs for the seed audio track p, and the mean vector $m_q$, the covariance matrix $\Sigma_q$ and the inverse covariance matrix $\Sigma_q^{-1}$ for the Gaussian distribution of MFCCs for a catalogue audio track q.

$$KLs(p, q) = \qquad (1)$$
$$\frac{1}{2}(Tr(\Sigma_p^{-1}\Sigma_q + \Sigma_q^{-1}\Sigma_p) + (m_p - m_q)^T(\Sigma_p^{-1} + \Sigma_q^{-1})(m_p - m_q) - 2d)$$

Where Tr denotes the trace of a matrix, and d is the order of MFCC analysis, in other words the number of MFCCs per analysis frame.

It is to be appreciated that the mean vectors $m_q$ and $m_p$ will have the dimension of d×1, and the covariance and inverse covariance matrices $\Sigma_p, \Sigma_q, \Sigma_p^{-1}$ and $\Sigma_q^{-1}$ will have the dimension d×d.

It is to be further appreciated that the mean vectors $m_q$ and $m_p$ refer to the mean of the d MFCC vector components across all analysis frames for an audio track, and correspondingly the covariance matrix refers to the second central moments of the d MFCC vector components across all analysis frames for an audio track. That is, the element in the i, j position of the covariance matrix represents the covariance of the ith and jth feature vector component, estimated over all the analysis frames for an audio track. In some alternative embodiments, a subset of the analysis frames may be used for estimating the mean and the covariance. Examples include embodiments where, for example, only analysis frames where the energy exceeds a predetermined threshold are used in the mean and covariance estimation. Such operation may be desirable to exclude silent frames from affecting the estimates.

As stated above, the pre-screener 305 may use an approximation to the Kullback-Leibler divergence. The approximation may be formulated by expressing the Kullback-Leibler divergence in terms of diagonal-covariance Gaussian densities.

The approximation to the Kullback-Leibler divergence measure may be expressed as $$KLDs(p, q) = \qquad (2)$$
$$\Sigma_{i=1}^d \frac{1}{2}\left((m_p(i) - m_q(i))^2 (v_p(i)^2 + v_q(i)^2) + \frac{v_p(i)^2}{v_q(i)^2} + \frac{v_q(i)^2}{v_p(i)^2} - 2\right)$$

where $m_p(i)$ and $m_q(i)$ are the ith component of the MFCC mean vectors $m_p$ and $m_q$ respectively, and $v_p(i)$ is the ith component of the MFCC inverse standard deviation corresponding to the density p which is obtained by inverting the square root of the diagonal variance term i of $\Sigma_p$, and $v_q(i)$ is the ith component of the corresponding MFCC inverse standard deviation relating to the density q.

In embodiments the pre-screener 305 may have two modes of operation. In a first mode the pre-screener 305 may operate in a training mode in which the pre-screener may be arranged to work in a so called offline mode. In the second mode the pre-screener 305 maybe arranged to work as in online classifier whereby audio tracks from the catalogue 203 may be processed for their audio similarity with the seed audio track 304.

There is shown in FIG. 5 a flow chart depicting the offline or training mode of operation of the pre-screener 305.

During the offline or training mode the pre-screener 305 may be arranged to formulate the above approximation of the Kullback-Leibler divergence measure as a set of pre-calculated values which may be stored in a lookup table. This may provide the technical advantage of simplifying the Kullback-Leibler divergence calculation when the pre-screener 305 subsequently operates in the online mode.

In the training mode the pre-screener 305 may initially calculate a value for a global MFCC mean vector and a global MFCC standard deviation vector from at least some of the audio tracks contained within the music catalogue 303. This operation may be performed using either a subset of audio tracks contained within the music catalogue 303 or the entire set of audio tracks contained within the music catalogue 303.

The set of audio tracks from the catalogue 303 over which the global MFCC mean vector and global MFCC standard deviation are determined may be referred to as the training database.

In embodiments the global mean vector may be determined by taking the mean of the mean vectors for each audio track within the training database. The global standard deviation may be determined by taking the mean of the standard deviation vectors for each audio track within the training database. The standard deviation is the square root of the variance, which can be obtained from the covariance matrix which has been stored for each audio track.

The steps of determining the global MFCC mean vector and the global MFCC standard deviation vector for the training database is shown as processing steps 501 and 503 in FIG. 5.

The MFCC mean vector for each member audio track of the training base may then be normalised by removing the global mean vector. In embodiments this may be expressed as $$\begin{bmatrix} m_t(0) \\ \vdots \\ m_t(d-1) \end{bmatrix} - \begin{bmatrix} m_G(0) \\ \vdots \\ m_G(d-1) \end{bmatrix}, \qquad (3)$$

where $m_t(i)$ is a component of a MFCC mean vector $m_t$ associated with an audio track within the training database, and where $m_G(i)$ is a component of the global mean MFCC vector determined for the training base.

The step of normalising each audio track MFCC mean vector from the training database with the global MFCC mean vector is shown as processing step 505 in FIG. 5.

The MFCC standard deviation for each audio track within the training database may also be normalised in relation to the global MFCC standard deviation. In embodiments the normalisation can be expressed as $$\frac{\sigma_t(0)}{\sigma_G(0)} \cdots \frac{\sigma_t(d-1)}{\sigma_G(d-1)} \qquad (4)$$

where $\sigma_t(i)$ is the standard deviation of the ith MFCC for an audio track of the training database and $\sigma_G(i)$ is the corresponding standard deviation component from the global MFCC standard deviation calculated over the entire training base.

It is to be appreciated in embodiments that both the normalised MFCC mean vector and normalised MFCC standard deviation vector for each song in the training database is a vector comprising d vector components.

The step of normalising each audio track MFCC standard deviation vector from the training database with the global MFCC standard deviation vector is shown as processing step 505 in FIG. 5.

In embodiments the normalised mean vectors and the normalised standard deviations for each audio track within the training database may each be used to train a vector quantizer. In other words, the normalised mean vectors can be used to train a vector quantizer for the quantisation of the normalised mean vectors, and the normalised standard deviations can be used to train a vector quantizer for the quantization of the normalised inverse standard deviations.

In embodiments, a vector quantizer may be trained by partitioning the d dimensional vector space into a number of regions or cells and assigning a codevector to each region or cell. The codevector for each region may be determined by using approaches such as the K means iterative clustering algorithm over the training base. However, it is to be understood that other embodiments may equally adopt other approaches to training vector quantizers, such as for example Lloyd-max quantization, or using alternative clustering approaches such as min-max clustering, various divisive or agglomerative clustering methods, Gaussian mixture models, or the like.

In an example of a first group of embodiments the vector space for the normalised mean vectors may be partitioned into 32 regions using a K-means clustering algorithm. This will result in a vector quantizer codebook comprising $2^5$ quantization levels.

The step of training the vector quantizer for the normalised MFCC mean vectors is shown as processing step 509 in FIG. 5.

In a further example of the first group of embodiments the vector space for the normalised inverse standard deviation vectors may be partitioned into 16 regions also by using the K-means clustering algorithm. This will result in a vector quantizer codebook comprising $2^4$ quantization levels.

The step of training the vector quantizer for the normalised MFCC inverse standard deviation vectors is shown as processing step 511 in FIG. 5.

Finally, the pre-screener 305, as part of the off line mode of operation, may construct a look up table comprising values of the approximation to the Kullback-Leibler divergence measure as given by equation 2. In particular each look up table entry may comprise the value of the Kullback-Leibler divergence measure for a particular pairing of normalised MFCC mean codevector and normalised MFCC inverse standard deviation codevector.

In the first group of embodiments the look up table may be constructed for all possible combinations of pairings of normalised MFCC mean codevectors with normalised MFCC inverse standard deviation codevectors. For instance, in the above example in which there is deployed a normalised MFCC mean codebook of size $2^5$ and a normalised MFCC inverse standard deviation codebook of size $2^4$ codevectors there may be up to $2^5 \times 2^4$ look up table entries.

The step of generating the look up table of values for the approximation to the Kullback-Leibler divergence measure for combinations of normalised MFCC mean codevectors and normalised MFCC inverse standard deviation codevectors is shown as processing step 513 in FIG. 5.

In embodiments the global MFCC mean vector and global MFCC standard deviation vector may be stored for subsequent use by the pre-screener 305 when operating in an online mode of operation.

As stated above the pre-screener 305 maybe also be arranged to work as an online classifier (online mode) in which catalogue audio tracks may be processed for their audio similarity with the seed audio track 304.

In the online mode of operation the pre-screener 305 may be configured to pre-screen audio tracks from the audio catalogue 303 for their audio similarity with the seed audio track 304. In embodiments this pre-screening mode of operation may take the form of determining a subset of audio tracks from the audio catalogue 303 which are most similar to the seed audio track 304.

In a first group of embodiments the online mode of operation maybe realised by determining a plurality of divergence measures where each divergence measure is related to the divergence between the distribution of MFCCs of a seed audio track and a distribution of MFCCs of one of a plurality of catalogue audio tracks. The plurality of divergence measures may then be used to populate a histogram from which a threshold may be set in order to determine which catalogue audio tracks may form the subset of most similar catalogue audio tracks.

FIG. 6 is a flow diagram depicting the online classifier mode of operation of the pre-screener 305.

Initially, in the online mode of operation, the pre-screener 305 may be arranged to receive from the music feature extractor 301 the MFCC features for each analysis frame of the seed audio track 304.

The step of receiving the MFCC features for each analysis frame of the seed audio track is shown as processing step 601 in FIG. 6.

The pre-screener 305 may then determine the MFCC mean vector for the seed song, and then normalise said MFCC mean vector with the pre-stored global MFCC mean vector. The MFCC mean vector may be normalised according to equation 3 above.

Additionally, the pre-screener 305 may also be arranged to determine the MFCC standard deviation vector for analysis frames of the seed audio track, and normalise said MFCC standard deviation vector with the pre-stored global MFCC standard deviation vector. The MFCC standard deviation vector may be normalised according to equation 4 above.

The step of determining the normalised MFCC mean vector and normalised MFCC standard deviation vector for the seed audio track is shown as processing step 603 in FIG. 6.

Additionally, in the online mode of operation, the pre-screener 305 may also be arranged to receive from the music feature extractor 301 the MFCC based music features for each analysis frame of a catalogue audio track.

The step of receiving the MFCC based music features for each analysis frame of a catalogue audio track is shown as processing step 605 in FIG. 6.

As above the pre-screener 305 may also be arranged to determine the MFCC mean vector for the catalogue audio track and normalise said vector using the global MFCC mean vector according to equation 3 above.

Furthermore, the pre-screener may also be arranged to determine the covariance matrix of MFCCs from the analysis frames, and its corresponding inverse. The standard deviation vector is later obtained from the covariance matrix, and the covariance matrix and its inverse may be later needed for the calculation of the subsequent full audio similarity measure.

The step of determining the normalised MFCC mean vector and the normalised MFCC standard deviation vector for a catalogue audio track is shown as processing step 607 in FIG. 6.

The pre-screener may then quantize the normalised MFCC mean vectors for both the seed audio track and the catalogue audio track using the MFCC mean vector quantizer determined as part of the offline mode of operation.

The quantization steps may then result in a normalised MFCC mean codevectors for both the seed and catalogue audio tracks which can then be mapped to the pre-determined lookup table of approximated Kullback-Leibler values.

The step of quantizing the normalised MFCC mean vectors for both seed and catalogue audio tracks are shown in FIG. 6 as processing steps 609 and 611 respectively.

In a manner similar to that of processing steps 609 and 611, the pre-screener 305 may also quantize the inverse normalised MFCC standard deviation vector using the corresponding inverse normalised MFCC standard deviation vector quantizer determined during the offline mode of operation. As above this step will result in inverse normalised MFCC standard deviation codevectors for both the seed audio track catalogue audio tracks which can then be mapped to the pre-determined lookup table of approximated Kullback-Leibler divergence values.

The step of quantizing the inverse normalised MFCC standard deviation vectors for both seed and catalogue audio tracks are shown in FIG. 6 as processing steps 613 and 615 respectively.

Upon execution of processing steps 609 to 615 the pre-screener 305 is in a position to determine the approximated Kullback-Leibler divergence value from the lookup table corresponding to the seed audio track and a catalogue audio track.

The step of determining the approximated Kullback-Leibler divergence value from the lookup table is shown as processing step 617 in FIG. 6.

The approximated Kullback-Leibler divergence value from processing step 617 may then be used to populate a histogram of Kullback-Leibler divergence values, as depicted by processing step 619 in FIG. 6.

The pre-screener 305 may then be arranged to retrieve the next catalogue audio track from the catalogue 303, this is depicted as the loop back path 618 in FIG. 6. Whereupon the pre-screener 305 may repeat the processing steps 605, 607, 611, 615, 617 and 619 for the next catalogue audio track. In embodiments this loop back may be repeated for each of a plurality of audio tracks from the audio catalogue 303.

It is to be understood in embodiments that the result of the processing steps 601 to 619 in conjunction with the loop back path 618 is to produce a histogram of approximated Kullback-Leibler divergence values.

The pre-screener 305 may then use the histogram to determine a threshold for the approximated Kullback-Leibler divergence value where a proportion of the catalogue audio tracks are retained as a subset for further processing. This subset of catalogue audio tracks may be deemed the catalogue audio tracks which are most similar to the seed audio track.

In embodiments the threshold may be determined on the basis of choosing fixed proportion of most similar catalogue audio tracks. In other words the threshold may be adjusted to maintain a determined proportion of catalogue audio tracks which are deemed most similar to the seed audio track. For example, in a first group of embodiments the threshold may be adjusted to keep 10% of the catalogue audio tracks searched.

The processing step of determining the Kullback-Leibler divergence value threshold in order to select the subset of catalogue audio tracks is shown as processing step 620 in FIG. 6.

The overall processing step of determining a divergence value between the seed audio track and a catalogue audio track is shown in FIG. 4 as processing step 405.

With reference to FIG. 4 there is shown a feedback processing step 404 which corresponds to feedback path 619 in FIG. 6. In other words the feedback processing step signifies the selection of a further catalogue audio track from the audio catalogue 303 which may be used in the determination of the Kullback-Leibler divergence threshold value.

The overall processing step of determining the feature divergence threshold value is shown in FIG. 4 as processing step 407.

After determination of the Kullback-Leibler divergence threshold value, the acoustic audio similarity analyser 20 may be arranged to retain the catalogue audio tracks which have a Kullback-Leibler divergence less than said threshold value. In other words the acoustic audio similarity analyser 20 may be arranged to retain catalogue audio tracks which have a feature divergence value with the seed audio track which is less than the feature divergence threshold value.

The mean and variance MFCC vectors for each retained catalogue audio track may then be collated and stored for subsequent processing by the acoustic music similarity analyser 20.

With reference to FIG. 3 the output from the pre-screener 305 may be connected to a pre-screen store 307 in which the features relating to the retained catalogue audio tracks may be stored for subsequent processing.

The step of retaining the mean and variance MFCC vectors for each catalogue audio track which is determined to have a divergence value with the seed audio track which is below said threshold value is shown in FIG. 4 as processing step 409.

With reference to FIG. 3 the output from the pre-screen store 307 may be connected to an audio similarity determiner 309, in which the pre-screened catalogue audio tracks stored by the pre-screen store 307 may each be subjected to a further divergence measure with the seed audio track.

In embodiments the subset of pre-screened catalogue audio tracks may then each be further compared for audio similarity with the seed audio track by applying the Kullback-Leibler divergence measure as given by equation 1 above (rather than the approximated Kullback-Leibler divergence measure of equation 2.)

It is to be appreciated in embodiments that the Kullback-Leibler divergence measure as given by equation 1 may be applied between the seed audio track and each pre-screened catalogue audio track by using the retained MFCC mean vector and the covariance matrix and its inverse corresponding to the seed audio track and each pre-screened catalogue audio track.

In embodiments the acoustic music similarity analyser 20 may then apply the Kullback-Leibler divergence measure as given by equation 1 to each combination of the seed audio track with a pre-screened catalogue audio track on a catalogue song by catalogue song basis.

In embodiments the above application of the Kullback-Leibler divergence measure to the pre-screened catalogue audio tracks may result in the determination of the most acoustically similar catalogue audio track to the seed audio track.

Furthermore in some embodiments the above application of the Kullback-Leibler divergence measure to the pre-screened catalogue audio tracks may also result in an ordered list of catalogue audio tracks, in which the list may be ordered in terms of each catalogue audio track's acoustic similarity to the seed audio track.

The step of determining the audio similarity of each pre-screened catalogue audio track to the seed audio track using a further divergence measure is shown as processing step 411 in FIG. 4.

It is to be appreciated that embodiments may provide a technical advantage of enabling audio tracks from large music catalogue or database to be checked for their similarity to a seed audio track quickly and efficiently. The efficiency may be attained by deploying a pre-screener which can perform a rapid and efficient scan of the music catalogue or database for audio tracks which have similar audio characteristics to the seed audio track. The audio tracks retained by the pre-screening process can then be more thoroughly checked by their similarity with the seed audio track using a further audio similarity determiner. The technical advantage may be realised in the acoustic audio similarity analyser 20 by checking the similarity of the catalogue audio tracks to the seed audio track over a smaller set of pre-screened catalogue audio tracks.

The above embodiments are specifically described using audio features in the form of MFCCs. However, it is to be understood that other embodiments may equally be implemented using other suitable audio features. For example, other embodiments may deploy audio features such as s linear prediction coefficients (LPCs), LP cepstral coefficients, reflection coefficients, line spectral frequencies, perceptual linear prediction coefficients, warped LP coefficients, warped LP cepstral coefficients, spectral band energies, spectral band magnitudes, spectral band powers, cepstral coefficients calculated from the output of a Bark-scaled filterbank, wavelet coefficients, modified discrete cosines transform coefficients and discrete cosine transform coefficients. Furthermore, any of the previous features could be subjected to a combination of feature selection and/or transformation, such as principal component analysis, linear discriminant analysis, independent component analysis, or nonnegative matrix factorization.

Although the above examples describe embodiments of the application using the symmetrized Kullback-Leibler divergence as a divergence or distance measure between songs, it is appreciated that the invention could be implemented using any suitable distance or similarity measures. The first distance measure may be faster to compute than the second distance measure, thereby enabling an overall reduction in calculation time. Examples of alternative distance measures for pre-screening may include, for example, the Euclidean distance, Mahalanobis distance, Manhattan distance, or other suitable distance metrics.

The operations, procedures, functions and/or methods described in context of the audio feature extractor 301, pre-screener 305, re-screen store 307 and audio similarity determiner 309 may be distributed between these processing entities (or portions) in a manner different from the one(s) described hereinbefore. There may be, for example, further entities (or portions) for carrying out some of the operations procedures, functions and/or methods assigned in the description hereinbefore to the audio feature extractor 301, pre-screener 305, re-screen store 307 and audio similarity determiner 309 or there may be a single portion or unit for carrying out the operations, procedures, functions and/or methods described in context of the audio feature extractor 301, pre-screener 305, re-screen store 307 and audio similarity determiner 309.

In particular, the operations, procedures, functions and/or methods described in context of audio feature extractor 301, pre-screener 305, re-screen store 307 and audio similarity determiner 309 may be provided as software means, as hardware means, or as a combination of software means and hardware means. As an example in this regard, audio feature extractor 301, pre-screener 305, re-screen store 307 and/or audio similarity determiner 309 may be provided as an apparatus comprising means for determining a divergence measure between a statistical distribution of audio features of a first audio track and a statistical distribution of audio features of at least one further audio track; means for determining a divergence measure threshold value from at least the divergence measure between the statistical distribution of audio features of a first audio track and the statistical distribution of audio features of the at least one further audio track; and means for comparing the divergence measure with the divergence measure threshold value.

Although the above examples describe embodiments of the application operating within an apparatus 10, it would be appreciated that the invention as described below may be implemented as part of any device comprising the means to process audio signals. Thus, for example, embodiments of the application may be implemented in a mobile computing device such as tablet or mobile phone configured to communicate over fixed or wired communication paths.

User equipment may comprise an acoustic audio similarity analyser such as those described in embodiments of the application above.

It shall be appreciated that the term user equipment is intended to cover any suitable type of wireless user equipment, such as mobile telephones, portable data processing devices or portable web browsers.

Furthermore elements of a public land mobile network (PLMN) may also comprise an acoustic audio similarity analyser as described above.

In general, the various embodiments of the application may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the application may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this application may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the application may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:

(a) hardware-only circuit implementations (such as implementations in only analog and/or digital circuitry) and (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
    quantising parameters associated with a statistical distribution of audio features of a first audio track;
    quantising parameters associated with a statistical distribution of audio features of at least one further audio track, wherein the parameters associated with the statistical distribution of audio features of the first audio track and the at least one further audio track comprise at least one of: mean vector of mel-frequency cepstral coefficients for an audio analysis frame or standard deviation vector of mel-frequency cepstral coefficients for the audio analysis frame;
    selecting a divergence measure indicating a divergence between the first audio track and the at least one further audio track from a look up table of predetermined divergence values by using the quantised parameters associated with the statistical distribution of audio features of the first audio track and the quantised parameters associated with the statistical distribution of audio features of the at least one further audio track as inputs to the look up table;
    determining a divergence measure threshold value from at least the divergence measure between the statistical distribution of audio features of the first audio track and the statistical distribution of audio features of the at least one further audio track;
    comparing the divergence measure with the divergence measure threshold value in order to determine an audio similarity between the first audio track and the at least one further audio track;
    retaining the at least one further audio track dependent on whether the divergence measure is less than the divergence measure threshold value; and
    identifying the retained at least one further audio track is similar to the first audio track.

2. The method as claimed in claim 1, wherein the audio similarity of the retained at least one further audio track to the first audio track is based on a symmetrized Kullback-Leibler divergence measure.

3. The method as claimed in claim 1, wherein the look up table comprises a particular divergence measure for at least a pre-determined pairing of quantised parameters associated with the statistical distribution of audio features of the first audio track with quantised parameters associated with the statistical distribution of audio features of at least an audio track from a plurality of audio tracks.

4. The method as claimed in claim 1, wherein determining the divergence measure threshold value comprises:
    determining a statistical distribution of divergence measures from a plurality of divergence measures between the statistical distribution of audio features of the first audio track and the statistical distribution of audio features of the at least one further audio track; and
    determining a value of divergence measure which results in a pre-determined proportion of the statistical distribution of divergence measures.

5. The method as claimed in claim 1, wherein the at least one further audio track is an audio track from a store comprising a plurality of audio tracks, wherein the first audio track is a seed audio track, and wherein the store comprising the plurality of audio tracks is a catalogue of audio tracks of an electronic music distribution system.

6. The method as claimed in claim 1, wherein the audio features are a vector of mel-frequency cepstral coefficients for the audio analysis frame.

7. The method as claimed in claim 1, wherein the divergence measure is based on an approximation of a symmetrized Kullback-Leibler divergence measure.

8. An apparatus comprising at least one processor and at least one memory including computer program code for one or more programs, the at least one memory and the computer program code configured to, with the at least one processor, cause the apparatus to:
    quantise parameters associated with a statistical distribution of audio features of a first audio track;
    quantise parameters associated with a statistical distribution of audio features of at least one further audio track, wherein the parameters associated with the statistical distribution of audio features of the first audio track and the at least one further audio track comprise at least one of: mean vector of mel-frequency cepstral coefficients for an audio analysis frame or standard deviation vector of mel-frequency cepstral coefficients for the audio analysis frame;
select a divergence measure indicating a divergence between the first audio track and the at least one further audio track from a look up table of predetermined divergence values by using the quantised parameters associated with the statistical distribution of audio features of the first audio track and the quantised parameters associated with the statistical distribution of audio features of the at least one further audio track as inputs to the look up table;
determine a divergence measure threshold value from at least the divergence measure between the statistical distribution of audio features of a first audio track and the statistical distribution of audio features of the at least one further audio track;
compare the divergence measure with the divergence measure threshold value in order to determine an audio similarity between the first audio track and the at least one further audio track;
retain the at least one further audio track dependent on whether the divergence measure is less than the divergence measure threshold value; and
identify the retained at least one further audio track is similar to the first audio track.

9. The apparatus as claimed in claim 8, wherein the audio similarity of the retained at least one further audio track to the first audio track is based on a symmetrized Kullback-Leibler divergence measure.

10. The apparatus as claimed in claim 8, wherein the look up table comprises a particular divergence measure for at least a pre-determined pairing of quantised parameters associated with the statistical distribution of audio features of the first audio track with quantised parameters associated with the statistical distribution of audio features of at least an audio track from a plurality of audio tracks.

11. The apparatus as claimed in claim 8, wherein the apparatus caused to determine the divergence measure threshold value is further caused to:
determine a statistical distribution of divergence measures from a plurality of divergence measures between the statistical distribution of audio features of the first audio track and the statistical distribution of audio features of the at least one further audio track; and
determine a value of divergence measure which results in a pre-determined proportion of the statistical distribution of divergence measures.

12. The apparatus as claimed in claim 8, wherein the at least one further audio track is an audio track from a store comprising a plurality of audio tracks, wherein the first audio track is a seed audio track, and wherein the store comprising the plurality of audio tracks is a catalogue of audio tracks of an electronic music distribution system.

13. The apparatus as claimed in claim 8, wherein the audio features are a vector of mel-frequency cepstral coefficients for the audio analysis frame.

14. The apparatus as claimed in claim 8, wherein the divergence measure is based on an approximation of a symmetrized Kullback-Leibler divergence measure.

15. A computer program product comprising at least one non-transitory computer readable storage medium, the computer readable storage medium comprising a set of instructions, which when executed by one or more processors, causes an apparatus at least to perform:
quantising parameters associated with a statistical distribution of audio features of a first audio track;
quantising parameters associated with a statistical distribution of audio features of at least one further audio track, wherein the parameters associated with the statistical distribution of audio features of the first audio track and the at least one further audio track comprise at least one of: mean vector of mel-frequency cepstral coefficients for an audio analysis frame or standard deviation vector of mel-frequency cepstral coefficients for the audio analysis frame;
selecting a divergence measure indicating a divergence between the first audio track and the at least one further audio track from a look up table of predetermined divergence values by using the quantised parameters associated with the statistical distribution of audio features of the first audio track and the quantised parameters associated with the statistical distribution of audio features of the at least one further audio track as inputs to the look up table;
determining a divergence measure threshold value from at least the divergence measure between the statistical distribution of audio features of a first audio track and the statistical distribution of audio features of the at least one further audio track;
comparing the divergence measure with the divergence measure threshold value in order to determine an audio similarity between the first audio track and the at least one further audio track;
retaining the at least one further audio track dependent on whether the divergence measure is less than the divergence measure threshold value; and
identifying the retained at least one further audio track is similar to the first audio track.

16. The computer program product as claimed in claim 15, wherein the audio similarity of the retained at least one further audio track to the first audio track is based on a symmetrized Kullback-Leibler divergence measure.

17. The computer program product as claimed in claim 15, wherein the look up table comprises a particular divergence measure for at least a pre-determined pairing of quantised parameters associated with the statistical distribution of audio features of the first audio track with quantised parameters associated with the statistical distribution of audio features of at least an audio track from a plurality of audio tracks.

18. The computer program product as claimed in claim 15, wherein determining the divergence measure threshold value comprises:
determining a statistical distribution of divergence measures from a plurality of divergence measures between the statistical distribution of audio features of the first audio track and the statistical distribution of audio features of the at least one further audio track; and
determining a value of divergence measure which results in a pre-determined proportion of the statistical distribution of divergence measures.

19. The computer program product as claimed in claim 15, wherein the at least one further audio track is an audio track from a store comprising a plurality of audio tracks, wherein the first audio track is a seed audio track, and wherein the store comprising the plurality of audio tracks is a catalogue of audio tracks of an electronic music distribution system.

20. The computer program product as claimed in claim 15, wherein the audio features are a vector of mel-frequency cepstral coefficients for the audio analysis frame.

* * * * *